United States Statutory Invention Registration [19]

[11] Reg. Number: H377

Greig [43] Published: Dec. 1, 1987

[54] RELEASEABLE ADHESIVE PADS

[75] Inventor: Walter G. Greig, Lewiston, N.Y.

[73] Assignee: Moore Business Forms, Inc., Glenview, Ill.

[21] Appl. No.: 862,825

[22] Filed: May 13, 1986

[51] Int. Cl.[4] ..... B42D 1/00

[52] U.S. Cl. ..... 281/2; 281/3 A; 281/12; 428/42

[58] Field of Search ..... 281/1, 2, 3 R, 3 A, 281/12, 15 B; 428/40, 41, 42, 43, 194, 195, 200, 99

[56] References Cited

U.S. PATENT DOCUMENTS

| | | | |
|---|---|---|---|
| 2,424,680 | 7/1947 | Doyle | 428/43 |
| 3,582,111 | 6/1971 | Siiter | 281/3 R |
| 4,105,224 | 8/1978 | Rodebaugh et al. | 428/194 |
| 4,296,179 | 10/1981 | Wardwell | 428/43 |
| 4,317,852 | 3/1982 | Ogden | 428/40 |
| 4,500,021 | 2/1985 | Bildusas | 428/40 |
| 4,530,867 | 7/1985 | Gorman | 428/41 |
| 4,588,627 | 5/1986 | Isaksen et al. | 428/194 |

*Primary Examiner*—Deborah L. Kyle
*Assistant Examiner*—Michael J. Carone
*Attorney, Agent, or Firm*—Cushman, Darby & Cushman

[57] ABSTRACT

A pad is made up of sheets adhered one to the next by a releasable adhesive in which the adhesive is distributed on the sheets over more than a minor area of the sheets to more positively hold the sheets down on a surface to which applied, but retaining free edges to facilitate lifting off of the sheets by the user.

6 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 1.
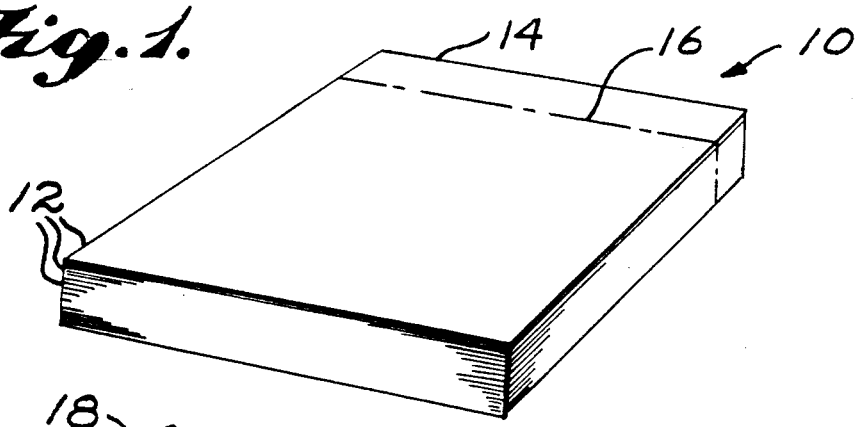
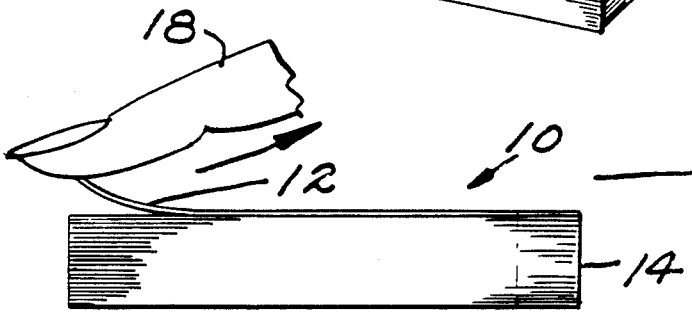
Fig. 2.
Fig. 3.
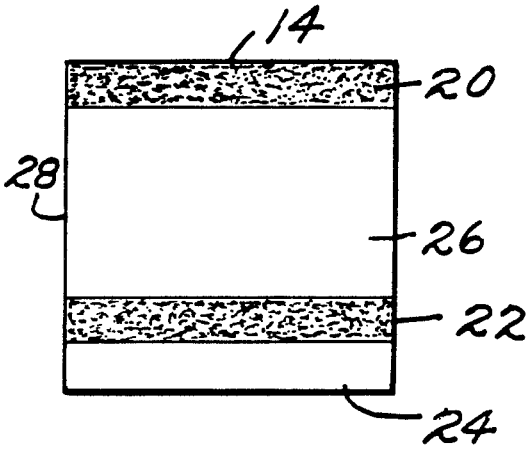
Fig. 4.
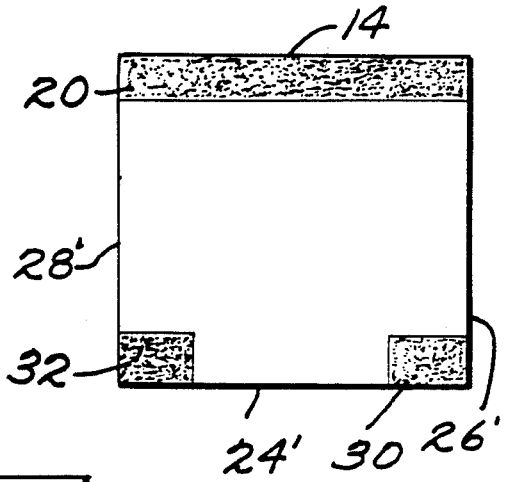
Fig. 5.
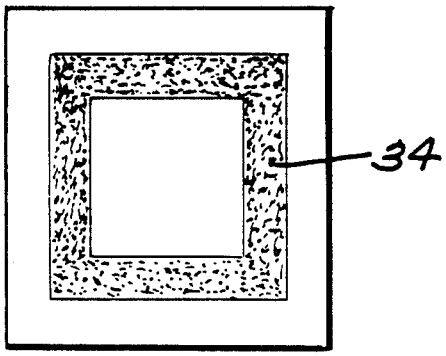

BEST AVAILABLE COPY

RELEASEABLE ADHESIVE PADS

BACKGROUND AND OBJECTS OF THE INVENTION

This invention relates to the pads now on the market made up of sheets of paper or the like adhered to one another by releaseable adhesive. Such pads enjoy widespread use because the sheets may be readily detached from the pad and then adhered to other surfaces. A line of such pads is sold by the assignee of the present invention (Moore Business Forms, Inc.) under the trademark NOTE STIX.

As presently marketed the aforesaid pads have adhesive only in a narrow strip along one edge of the sheets, thus providing a pad of sheets bound together along said edge. While this construction provides a very usable product, there is some disadvantage in use because a sheet removed from the pad and affixed to another surface may curl up from the surface except in the region of the strip of adhesive. The result is that objects that are moved about in the vicinity of the sheet may get under same and lift the entire sheet off of the surface. The object of this invention is to lessen such unintended removal of sheets from surfaces upon which they are supposed to remain.

In accordance with this invention the adhesive is placed on each sheet in a pattern that exceeds the mere strip along one edge of each sheet. Illustrative embodiments of the invention will now be described, with reference to the accompanying drawings.

DESCRIPTION OF DRAWINGS

FIG. 1 shows a typical prior art pad with adhesive along only one edge of each sheet.

FIG. 2 shows how a top sheet is normally lifted off of the pad by a person moving his/her finger upward over an adhesive-free edge of the top sheet of a pad.

FIG. 3 shows a first pattern of adhesive according to the present invention.

FIG. 4 shows a second pattern of adhesive according to the present invention.

FIG. 5 shows a third pattern of adhesive according to the present invention.

DETAILED DESCRIPTION OF EMBODIMENTS OF THE INVENTION

In FIG. 1 the reference character 10 shows a typical pad now on the market made up of a multiplicity of sheets 12 adhered together by a strip of releaseable adhesive along one edge 14 of each sheet of the pad. The releaseable adhesive is normally on the bottom surface of each sheet, leaving the top surface entirely free of adhesive so as to not interfere with the use of the entire surface for placing notes, etc., thereon. The location of the adhesive is indicated in FIG. 1 by the chain line strip 16. That is, the adhesive is distributed over an area bounded by edge 14 and line 16. The marking by line 16 is only for descriptive purposes only, and no such marking will appear on the actual pad.

FIG. 2 is a side elevational view of the pad of FIG. 1 which shows how sheets are normally removed from the pad, that is, by a finger 18 of the user being moved upwardly and inwardly over a free (non-adhesive) edge of the pad to raise the top sheet.

As mentioned in the introduction to this specification, there are problems when the adhesive is only along one edge of the sheets of the pad. FIG. 3 shows a first illustrative embodiment of the present invention. Here the view is of the bottom of a sheet, and the areas where the adhesive is present are shown by an array of short strokes of a pen. In the FIG. 3 case, one strip of adhesive 20 is located along one edge 14 of the sheets—the same as in FIG. 1. However, another strip 22 of adhesive is placed near but not at the opposite edge 24 of the sheets. By providing adhesive strip 22 three edges 24, 26 and 28 are still available for the finger removal step. In use, the strip 22 will serve to hold the sheet down on a surface, and lessen the likelihood of some object getting under the sheet to lift it from the surface.

FIG. 4 shows a second illustrative embodiment of the invention. Here an adhesive strip 20 is placed along edge 14 of the sheets, with additional areas of adhesive 30 and 32 at the corners of the sheets remote from edge 14 and strip 20. Again, the majority of the edges, here marked 24', 26' and 28' are free of adhesive and available for the finger removal step.

FIG. 5 shows a third illustrative embodiment of the invention. In this case a strip of adhesive 34 is placed to run parallel to but inward of all edges of the sheets, thus leaving all of the edges of the sheets free of adhesive and available for the finger removal step.

Having described three illustrative embodiments of the invention it will be seen that many more configurations of adhesive come within the scope of the invention. For example, if the cost of adhesive and therefore the quantity used is no factor, the entire area of the sheets apart from margins for the finger-lifting step could be covered with adhesive. In view of the many modifications that are possible the scope of the invention is to be determined from the appended claims.

What is claimed is:

1. A pad comprising:

a plurality of sheets adhered to one another by releasable adhesive, each of the plurality of sheets having the adhesive placed in more than one striplike position distributed over an underside of each sheet but which adhesive nevertheless leaves at least a portion of at least one edge of each sheet free of adhesive to facilitate removal of each sheet from the pad.

2. The pad as recited in claim 1 in which a portion of the adhesive is distributed as a strip near to but spaced from at least one edge of each sheet.

3. The pad as recited in claim 1 in which the adhesive is positioned in at least two strips parallel to at least two edges of each sheet, but with at least one strip set back from at least one edge.

4. The pad as recited in claim 1 in which the adhesive is positioned in at least four set-back strips which extend along and parallel to respective dges of each sheet.

5. The pad as recited in claim 1 in which a portion of the adhesive is positioned in at least one corner of each sheet but leaves a portion of at least one edge which originates at one corner free of adhesive.

6. The pad as recited in claim 5 in which adhesive is positioned in at least two corners of each sheet.

* * * * *